(12) United States Patent
Jordan et al.

(10) Patent No.: US 10,847,956 B1
(45) Date of Patent: Nov. 24, 2020

(54) SWIVEL ASSEMBLY FOR CABLE-PULLING PURPOSES

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 129 days.

(21) Appl. No.: 16/350,111

(22) Filed: Sep. 26, 2018

(51) Int. Cl.
*H02G 1/08* (2006.01)

(52) U.S. Cl.
CPC .................. *H02G 1/081* (2013.01)

(58) Field of Classification Search
CPC ............... H02G 1/081; H02G 1/085
See application file for complete search history.

(56) References Cited

U.S. PATENT DOCUMENTS

| | | | | |
|---|---|---|---|---|
| 3,675,898 A | * | 7/1972 | Fattor | H02G 1/081 254/134.3 FT |
| 4,101,114 A | * | 7/1978 | Martin | H02G 1/081 254/134.3 FT |
| 5,395,091 A | * | 3/1995 | Craddock | H02G 1/08 254/134.3 FT |
| 2015/0034891 A1 | * | 2/2015 | Carlson | H02G 1/081 254/134.3 R |

* cited by examiner

*Primary Examiner* — Lee D Wilson
(74) *Attorney, Agent, or Firm* — Michael E. McKee

(57) ABSTRACT

A swivel coupling assembly includes a first elongated head to which a first cable is connectable and a second elongated head to which a second cable is connectable. A flexible tension member includes one end section which extends through the first head and is prevented from passing out of the first head toward the second head, and the tension member includes an opposite end section which extends through the second head and is prevented from passing out of the second head toward the first head. The first head, the second head and the tension member are capable of being rotated relative to one another, and the flexible tension member possesses a length sufficient to permit the first and second heads to be moved relative to one another between a position at which the longitudinal axes of the first and second heads are substantially aligned and a position at which the longitudinal axes of the first and second heads are oriented at substantially a right angle.

20 Claims, 4 Drawing Sheets

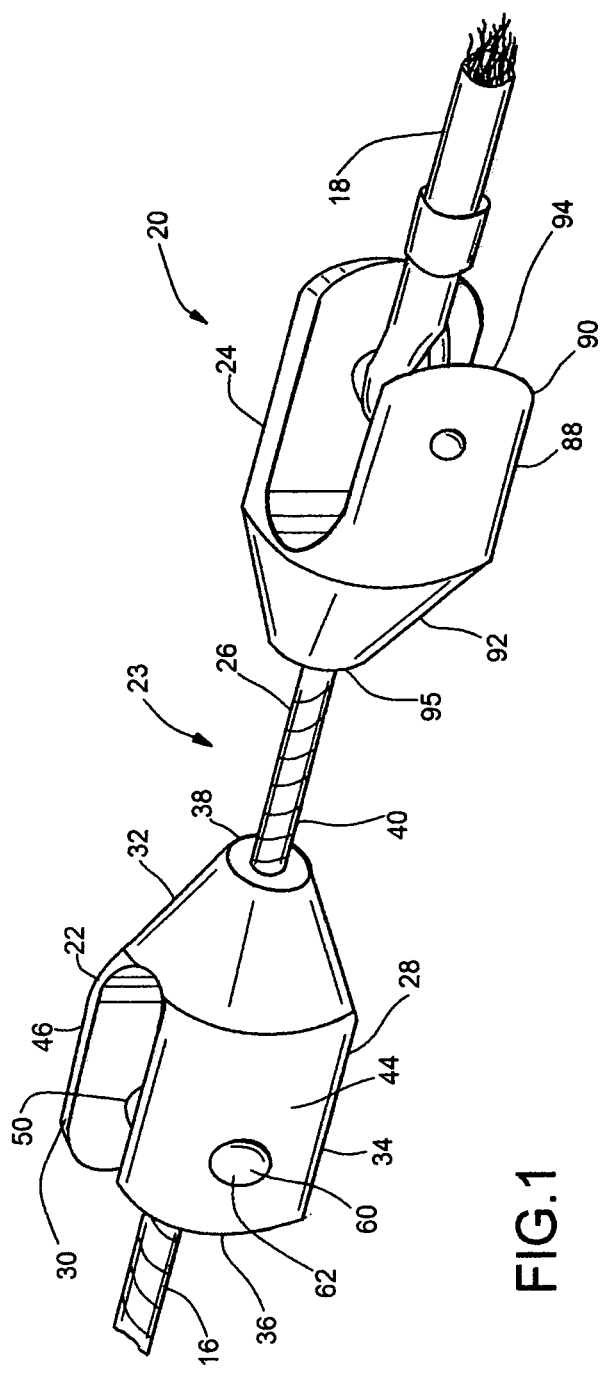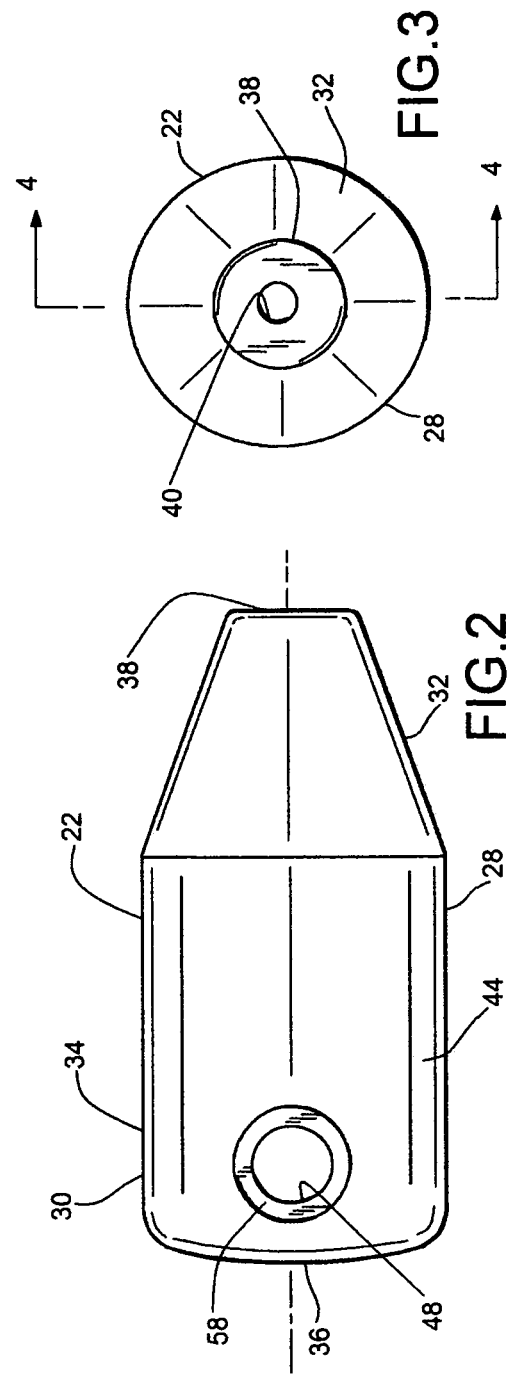

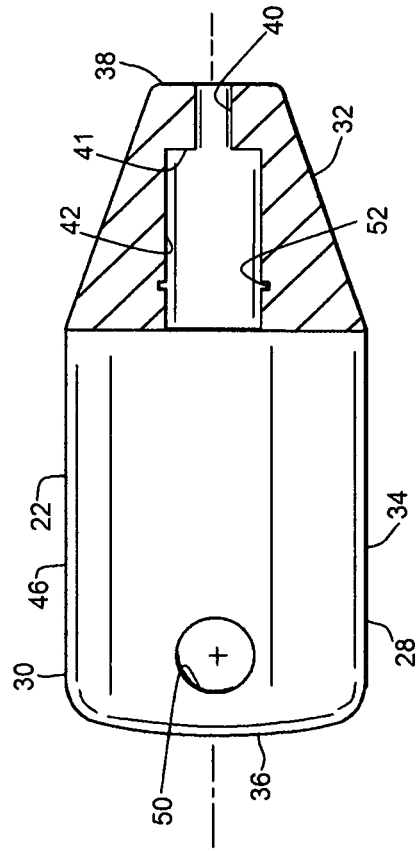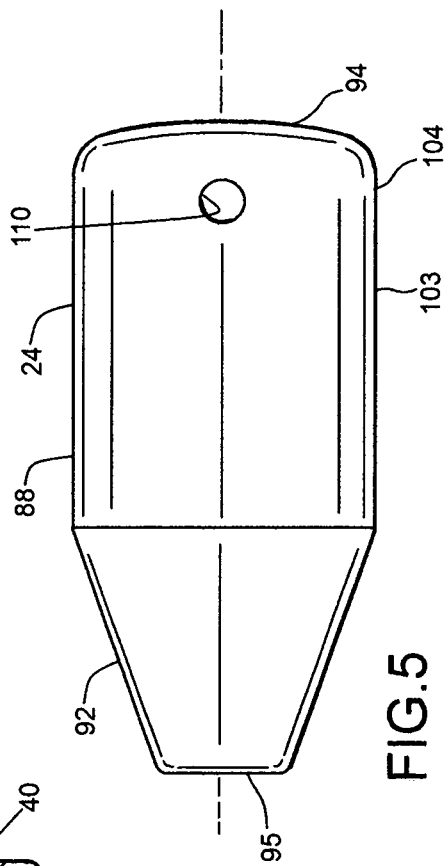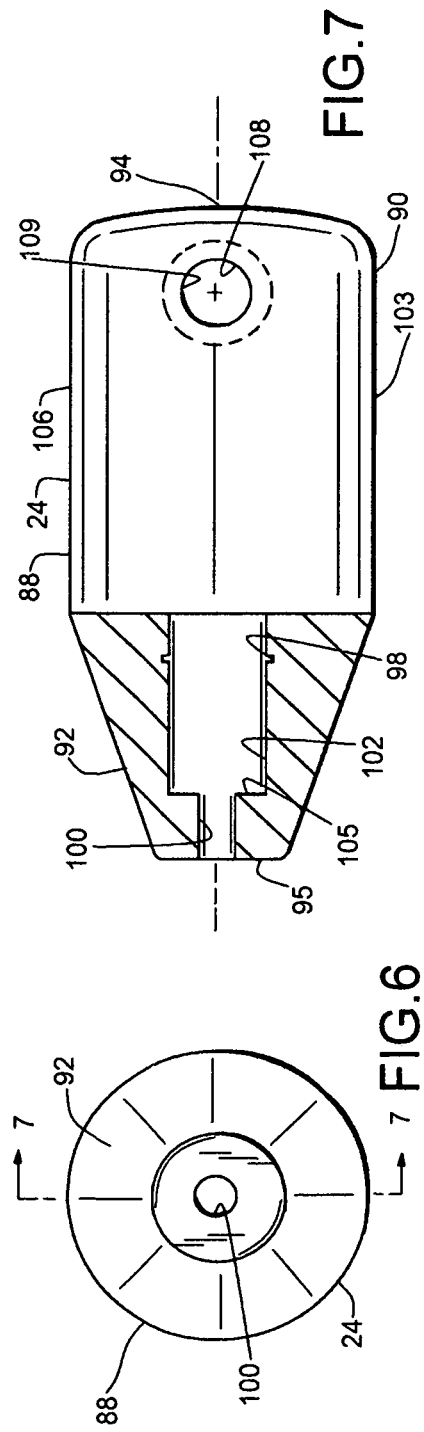

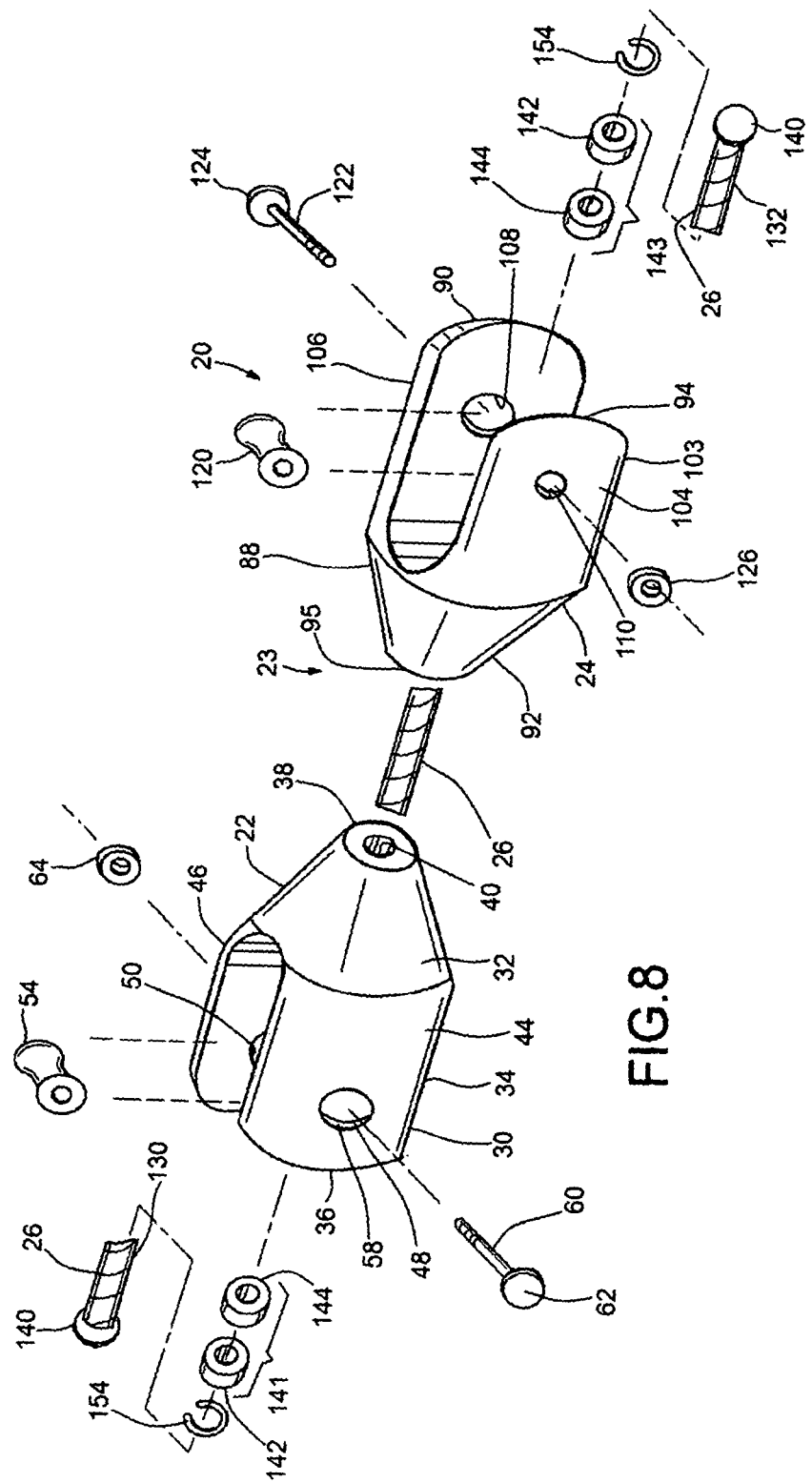

SWIVEL ASSEMBLY FOR CABLE-PULLING PURPOSES

BACKGROUND OF THE INVENTION

This invention relates generally to means and methods for pulling a cable, or wire, between two sites and relates, more particularly, to a coupling device used to join the ends of two cables, or wires, together for purposes of pulling the two cables along a desired path.

For the purpose of positioning a first cable, or wire, inside of a passageway or conduit, it is common for a second cable (e.g. a pulling cable), or wire, to be routed through the passageway and then connected, by way of a coupling device, to the first cable. The second cable is then pulled upon so that the coupled second cable and first cable are drawn, in sequence, through the passageway. Such a coupling device commonly possesses a first head which is connectable to the first cable and a second head to which the second cable is connectable. Moreover, the first and second heads of such a coupling device are commonly capable of being rotated relative to one another to permit the cables to rotate relative to one another as the coupled cables are being pulled along the passageway.

Commonly, coupling devices utilized for coupling cables together are relatively lengthy, and the lengths of such devices render it difficult for such a device to be maneuvered, or pulled, through a bend in a passageway.

Examples of coupling devices of the aforedescribed class are shown and described in U.S. Pat. Nos. 4,600,331 and 4,687,365.

It would be desirable to provide a new and improved coupling device for coupling two cables together and whose design improves upon the ability of the coupling device to be pulled, or maneuvered, around a bend in a passageway or conduit through which the cables are desired to be pulled.

Accordingly, it is an object of the present invention to provide a new and improved coupling device for connecting the ends of two cables, or wires, together for cable-pulling purposes.

Another object of the present invention is to provide such a coupling device having an enhanced capacity for moving through a bend of a conduit.

Still another object of the present invention is to provide such a coupling device having two connecting heads which are capable of being rotated with respect to one another.

Yet another object of the present invention is to provide such a coupling device which possesses the capacity to withstand relatively large pulling forces.

A further object of the present invention is to provide such a coupling device which is uncomplicated in structure, yet effective in operation.

SUMMARY OF THE INVENTION

This invention resides in a swivel coupling assembly for cable-pulling purposes.

The swivel coupling assembly includes a first head having a body to which a first cable is connectable and a second head having a body to which a second cable is connectable. The body of the first head defines a first through-opening which extends longitudinally therethrough, and the body of the second head defines a second through-opening which extends longitudinally therethrough. In addition, the assembly includes a flexible tension member having two opposite first and second end sections wherein the first end section of the tension member extends through the first through-opening of body of the first head and is prevented from passing out of the first through-opening toward the body of the second head and the second end section of the tension member extends through the second through-opening of the body of the second head and is prevented from passing out of the second through-opening toward the body of the first head. Moreover, the body of the first head and the first end section of the tension member are capable of being rotated relative to one another, and the body of the second head and the second end section of the tension member are capable of being rotated relative to one another. Further still, the flexible tension member possesses a length sufficient to permit the first and second heads to be moved relative to one another from a first position at which the longitudinal axes of the bodies of the first and second heads are substantially aligned to a second position at which the longitudinal axes of the bodies of the first and second heads are oriented at substantially a right angle.

BRIEF DESCRIPTION OF THE DRAWINGS

FIG. 1 is a perspective view of a swivel assembly within which features of the present invention are embodied.

FIG. 2 is a plan view of the leading head of the FIG. 1 assembly as seen generally from the left in FIG. 1.

FIG. 3 is an end view of the leading head of the FIG. 1 assembly as seen from the right in FIG. 2.

FIG. 4 is a cross-sectional view taken about line 4-4 of FIG. 3.

FIG. 5 is a plan view of the trailing head of the FIG. 1 assembly as seen generally from the left in FIG. 1

FIG. 6 is an end view of the leading head of the FIG. 1 assembly as seen from the left in FIG. 5.

FIG. 7 is a cross-sectional view taken about line 7-7 of FIG. 6.

FIG. 8 is a perspective view, shown exploded, of the FIG. 1 assembly.

DETAILED DESCRIPTION OF AN ILLUSTRATIVE EMBODIMENT

Figure 9:
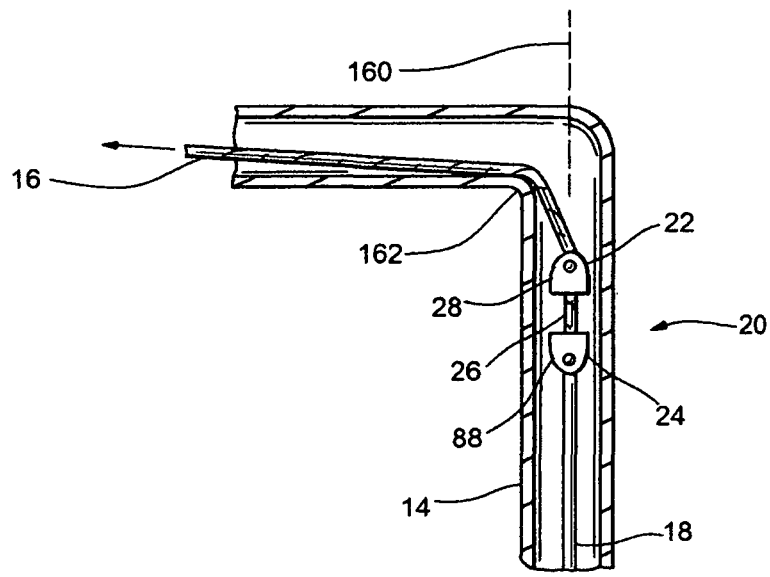
FIGS. 9-11 are sequential views schematically illustrating the assembly of FIG. 1 being used to pull a cable through a conduit.
Figure 10:
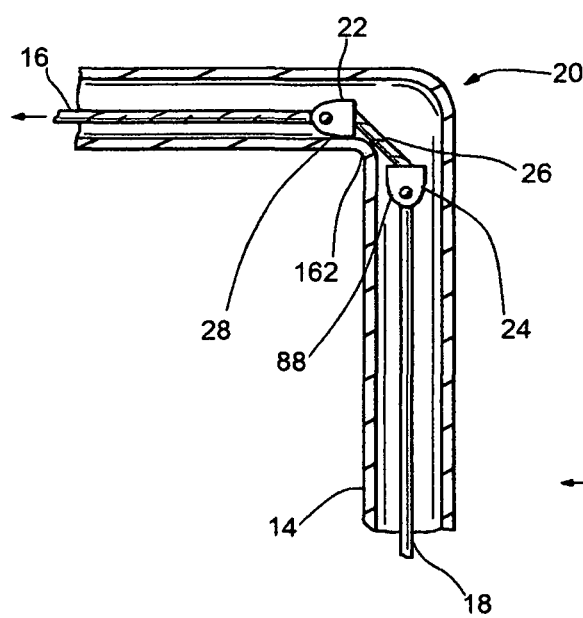
Figure 11:
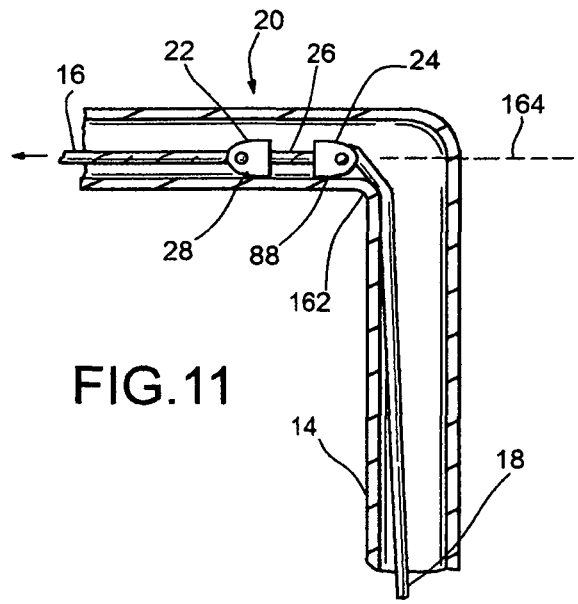

Turning now to the drawings in greater detail and considering first FIG. 1, there is illustrated an embodiment, generally indicated 20, of a swivel assembly, which is well-suited for use in pulling a wire or cable along a conduit. As used herein, the terms "wire" and "cable" are interchangeable. Briefly, the assembly 20 includes a leading head 22 and a trailing head 24 which are joined together by a flexible tension member 23 in the form of a cable section 26. In use, a pulling cable 16 is connected to the leading head 22, and a cable, indicated 18, to be pulled with the assembly 20 is connected to the trailing head 24. By applying pulling forces upon the leading head 22 by way of the cable 16, the trailing head 24, with the cable 18 to be pulled attached thereto, is pulled along a conduit 14 (FIGS. 9-11).

With reference to FIGS. 1-4, the leading head 22 includes an elongated body 28 having a leading end portion 30 and an opposite trailing end portion 32. The trailing end portion 32 of the body 28 is somewhat conical in shape so that the diameter of the trailing end portion 32 becomes smaller in size as a path is traced rearwardly along the body 28 of the leading head 22 from the forwardmost end, indicated 36, of the leading head 22 to the rearwardmost end, indicated 38, thereof. Furthermore, there is provided a central through-opening 40 which extends axially along the length of the body 28, and a cylindrical recess 42 surrounds the central through-opening 40 and opens forwardly of the body 28. The recess 42 forms a forwardly-directed shoulder surface 41 (FIG. 4) with the through-opening 40; and an annular groove 52 is formed along the side of the recess 42 adjacent the opening thereof for accepting a retaining ring (described herein) positioned therein.

The leading end portion 30 of the leading head 24 is in the form of a bifurcated clevis 34 having a pair of forwardly-directed fork portions 44 and 46. Aligned through-openings 48 and 50 are formed within the fork portions 44 and 46 to provide pin-accepting openings which extend laterally through the body 22. For attachment of the pulling cable 16 to the leading head 22 and as best shown in FIG. 8, a spool-like item 54 defining a center opening which extends therethough and a smooth exterior surface is positioned between the fork portions 44 and 46; and a pin 60 is positioned through the center opening of the spool-like item 54 and secured through the through-openings 48 and 50. Preferably, the interior surface of one of the through-opening 48 defines a shoulder surface 58 which opens outboard of the fork portions 44 and 46, and the pin 60 having a head 62 at one end thereof is directed shank-end first through the through-openings 48 and 50. In addition, a nut 64 is adapted to be threadably secured about the end of the pin 60 opposite the head 62 thereof. Together, the head 62 of the pin 60 and the nut 64 cooperate with the fork portions 44 and 46 or, more specifically, the interior surfaces of the through-openings 48 and 50 to prevent the inadvertent withdrawal of the pin 60 from the fork portions 44 and 46. With the spool-like item 54 thus secured between the fork portions 44 and 46, an end of the pulling cable 16 can be looped about the exterior surface of the spool-like item 54 and clamped, tied or otherwise secured to the remainder of the cable 16 to thereby secure the pulling cable 16 to the leading head 22.

With reference still to FIGS. 1 and 5-7, the trailing head 24 includes an elongated body 88 having a trailing end portion 90 and an opposite leading end portion 92. The lending end portion 92 is somewhat conical in shape so that the diameter of the leading end portion 92 becomes smaller in size as a path is traced forwardly along the body 88 of the trailing head 24 from the rearwardmost end, indicated 94, of the trailing head 24 to the forwardmost end, indicated 95, thereof. Furthermore, the body 88 of the trailing head 24 is provided with a central through-opening 100 which extends axially along the length of the body 88, and a circular recess 102 surrounds the central through-opening 100 and opens rearwardly of the body 88. The recess 102 forms a rearwardly-directed shoulder surface 105 (FIG. 7) with the through-opening 100; and an annular groove 98 is formed along the side of the recess 102 adjacent the opening thereof for accepting a retaining ring (described herein) positioned therein.

Meanwhile, the trailing end portion 90 of the body 88 of the trailing head 28 is in the form of a bifurcated clevis 103 having a pair of rearwardly-directed fork portions 104 and 106. Aligned through-openings 108 and 110 are defined within the fork portions 104 and 106 to provide pin-accepting openings which extend laterally through the body 88. For attachment of the cable 18 to be pulled to the trailing head 24, a spool-like item 120 defining a center opening which extends therethrough and a smooth outer surface is positioned between the fork portions 104 and 106; and a pin 122 is positioned through the center opening of the spool-like item 120 and the aligned through-openings 108 and 110. Preferably, the interior surface of one of the through-opening 108 defines a shoulder surface 109 which opens outboard of the fork portions 104 and 106, and the pin 122 has a head 124 at one end thereof for abutting the shoulder surface 109 when the pin 122 is directed shank-end-first through the through-openings 108, 110. In addition, a nut 126 is adapted to be threadably secured about the end of the pin 122 opposite the head 124. Together, the head 124 of the pin 122 and the nut 126 cooperate with the fork portions 104 and 106 or, more specifically, the interior surfaces of the through-openings 108 and 110 to prevent the inadvertent withdrawal of the pin 122 from the fork portions 104 and 106. With the spool-like item 120 thus secured between the fork portions 104 and 106, an end of the cable 18 can be looped about the exterior surface of the spool-like item 120 and clamped, tied or otherwise secured to the remainder of the cable 18 to thereby secure the cable 18 to the trailing head 24.

Each body 28 and 88 of the leading and trailing heads 22, 24, as well as each of the pins 60 and 122, is constructed of metal, such as steel.

With reference to FIG. 8, the cable section 26 which is connected between the leading and trailing heads 22, 24 is preferably constructed of steel and has two opposite end portions 130, 132 which each extend through a through-opening 40 or 100 of a corresponding leading head 22 or trailing head 24. In addition, a bolus 140 is fixedly secured to each end portion 130 or 132 at the terminus thereof to prevent the end portion 130 or 132 from backing out of the corresponding through-opening 40 or 100 and moving toward the other of the trailing head 24 and the leading head 22.

It is a feature of the assembly 20 that the opposite end portions 130, 132 of the cable section 26 which are positioned within the through-openings 40, 100 of the leading and trailing heads 22, 24 are permitted to rotate relative to the head 22 or 24 within which the cable end portion 130 or 132 is positioned. To facilitate this permitted rotation between the aforedescribed components, the assembly 20 includes two sets 141, 143 of roller bearings 142, 144 wherein each bearing set 141 or 143 is positioned about a corresponding end portion 130 or 132 of the cable section 26 and disposed in a stacked relationship within the circular recess 42 or 102 associated with the through-opening 40 or 100 of the corresponding leading or trailing head 22 or 24. The bearings 142 and 144 of each bearing set 141 or 143 are provided with inner and outer races, and a plurality of spherical bearing balls are captured between the inner and outer races. The bearings 142 or 144 of each set 141 or 143 are positioned within a corresponding recess 42 or 102 so that the outer races thereof bear against a corresponding shoulder surface 41 or 105 thereof and are retained within the recess 42 or 102 with a retaining ring 154 securable in place within the annular groove 52 or 98 formed adjacent the opening of the recess 42 or 102.

With the set 141 of bearings 142, 144 being secured within the recess 42 associated with the through-opening 40 of the leading head 22, the bearings 142, 144 are in condition to permit the cable end portion 130 to rotate relative to the leading head 22 when any pull upon the cable section 26 urges the bolus 140 of the cable end section 130 into engagement with the inner race of the forwardmost bearing 142 disposed within the recess 42. That is to say, that when the bolus 140 associated with the cable end portion 130 is forced to bear against the inner race of the bearing 142 of the bearing set 141 and the cable section 26 is twisted along its length and thus urged to rotate relative to the leading head 22 (as may occur when the assembly 20 is used to pull a cable 18 through a conduit 14), the bearings 142, 144 of the bearing set 141 permit the cable section 26 to rotate relative to the leading head 22 with relatively little friction being generated between the cable end section 130 and the leading head 22.

Similarly and with the set 143 of bearings 142, 144 being secured within the recess 102 associated with the through-opening 100 of the trailing head 24, the bearings 142, 144 are in condition to permit the cable end portion 132 of the cable section 26 to rotate relative to the trailing head 24 when any pull upon the cable section 26 urges the bolus 140 of the cable end section 132 into engagement with the inner race of the rearwardmost bearing 144 disposed within the recess 102. That is to say, that when the bolus 140 of the cable end portion 132 is forced to bear against the inner race of the bearing 142 of the bearing set 143 and the cable section 26 is twisted along its length and thus urged to rotate relative to the trailing head 24 (as may occur when the assembly 20 is used to pull a cable 18 through a conduit 14), the bearings 142, 144 of the bearing set 143 permit the cable section 26 to rotate relative to the trailing head 24 with relatively little friction being generated between the cable end section 132 and the trailing head 24.

Exemplary dimensions of the swivel assembly 20 are provided here as follows: the length of each body 28 or 88 of the first and second heads 22, 24 is about 3.4 inches in length; the length of each conically-shaped end portion 32 or 92 of the first and second heads 22, 24 is about 1.4 inches in length; the largest diameter of each conically-shaped end portion 32 or 92 of the first and second heads 22, 24 is about 1.9 inches; the smallest diameter of each conically-shaped end portion 32 or 92 of the first and second heads 22, 24 is about 1.0 inches; the diameter of each through-opening 40 or 100 is about 0.19 inches; and diameter of each circular recess 42 or 102 is about 0.5 inches; and the cable section 26 (as measured between one bolus 140 and the other bolus 140) is at least about 2.0 inches in length and is about 0.25 inches in diameter.

With reference to FIGS. 9-11 and to utilize the swivel assembly 20 to pull a cable 18 through a conduit 14, a pulling cable 16 is routed through the conduit 14 and then one end thereof is secured to the leading head 22 of the swivel assembly 20 by securing an end of the cable 16 around the spool-like item 54 of the leading head 22. To this end, the cable 16 can be simply looped around the exterior surface of the spool-like item 54, and then the end of the cable 16 can be simply folded back upon itself and tied in a knot, clamped or otherwise secured to the remainder of the cable 16. In a similar manner, the cable 18 to be pulled with the assembly 20 is secured about the spool-like item 120 of the trailing head 24. Then, the pulling cable 16 is pulled upon so that the swivel assembly 20 and the cable 18 are pulled in sequence through the conduit 14.

As long as the section of conduit 14 through which the swivel assembly 20 is pulled is relatively straight, the longitudinal axes of the leading head 22 and the trailing head 24 are substantially aligned along an axis 160, as best shown in FIG. 9. However, when the swivel assembly 20 reaches a bend 162 (e.g. of substantially ninety degrees) in the conduit (as best shown in FIG. 10), the leading head 22 first moves around the bend 162 in advance of the trailing head 24 and the cable 16 so that during the movement of the assembly 20 midway around the bend 162, the longitudinal axes of the leading head 22 and the trailing head 24 form about a right angle. It follows that during the movement of the assembly 20 through the bend 162, the cable section 26 is permitted to flex (between its end sections 130, 132) so that the longitudinal axes of the leading head 22 and the trailing head 24 are permitted to move out of aligned relationship with one another. As the trailing head 24 is eventually pulled around the bend 162 (as best viewed in FIG. 11), the longitudinal axes of the leading head 22 and the trailing head 24 return into a substantially aligned relationship with one another along an axis 164. It also follows that if at any moment during a cable-pulling operation performed with the swivel assembly 20, the leading head 22, cable section 26 or trailing head 24 are twisted or otherwise urged to rotate relative to one another, the permitted rotation of each bolus 140 disposed at a corresponding end section 130 or 132 of the cable section 26 relative to the leading head 22 or the trailing head 24 accommodates such a relative rotation between the aforementioned components.

It follows from the foregoing that a swivel assembly 20 for cable-pulling purposes has been shown and described which includes a first, or leading, head 22 having an elongated body 28 to which a first, or pulling, cable 16 is connectable and a second, or trailing, head 24 having an elongated body 88 to which a second cable 18 is connectable. Furthermore, the body 28 of the first head 22 defines a first through-opening 40 which extends longitudinally therethrough, and the body 88 of the second head 24 defines a second through-opening 100 which extends longitudinally therethrough. In addition, the assembly 20 includes a flexible tension member 23 having two opposite first and second end sections 130, 132 wherein the first end section 130 of the tension member 23 extends through the first through-opening 40 of the body 28 of the first head 22 and is prevented from passing out of the through-opening 40 toward the body 88 of the second head 24, and the second end section 132 of the tension member 23 extends through the second through-opening 100 of the body 88 of the second head 24 and is prevented from passing out of the through-opening 100 toward the body 88 of the first head 22. Moreover, the body 28 of the first head 22 and the first end section 130 of the tension member 23 are capable of being rotated relative to one another and the body 88 of the second head 24 and the second end second 132 of the tension member 23 are capable of being rotated relative to one another. Further still, the tension member 23 possesses a length sufficient to permit the first and second heads 22, 24 to be moved with respect to one another from a first position at which the longitudinal axes of the bodies 28, 88 of the first and second heads 22, 24 are substantially aligned and a second position at which the longitudinal axes of the bodies 28, 88 of the first and second heads 22, 24 are oriented at substantially a right angle.

It will be understood that numerous modifications and substitutions can be had to the aforedescribed embodiment 20 without departing from the spirit of the invention. For example, although the head 22 of the embodiment 20 has been described herein as a leading head and the head 24 has been described as a trailing head, in practice, either head 22 or 24 can function as a leading head while the other head 24 or 22 functions as a trailing head. Furthermore and although the bearings 142, 144 of the bearing sets 141, 143 have been shown and described as possessing spherical bearing balls, the bearings 142 or 144 could be of another style or bearings, such as thrust bearings which possess cylindrically- or frustoconically-shaped rollers.

Accordingly, the aforedescribed embodiment 20 is intended for the purpose of illustration and not as limitation.

The invention claimed is:

1. A swivel coupling assembly for cable-pulling purposes, said assembly comprising:

a first head having a body to which a first cable is connectable, the body of the first head defining a first through-opening which extends longitudinally through the body of the first head, a second head having an elongated body to which a second cable is connectable, the body of the second head defining a second through-opening which extends longitudinally through the body of the second head, and a flexible tension member having two opposite first and second end sections wherein the first end section of the tension member extends through the first through-opening of body of the first head and is prevented from passing out of the first through-opening toward the body of the second head and the second end section of the tension member extends through the second through-opening of the body of the second head and is prevented from passing out of the second through-opening toward the body of the first head and wherein the body of the first head and the first end section of the tension member are capable of being rotated relative to one another and the body of the second head and the second end section of the tension member are capable of being rotated relative to one another; and wherein the flexible tension member possesses a length sufficient to permit the first and second heads to be moved with respect to one another from a first position at which the longitudinal axes of the bodies of the first and second heads are substantially aligned to a second position at which the longitudinal axes of the bodies of the first and second heads are oriented at substantially a right angle; and wherein one of the first and second end sections of the tension member terminates at a bolus which prevents the passage of the one of the first and second end sections of the tension member out of a corresponding first or second through-opening as aforesaid.

2. The assembly as defined in claim 1 wherein the first end section of the tension member terminates at a first bolus which prevents the passage of the first end section of the tension member out of the first through-opening as aforesaid and the second end section of the tension member terminates at a second bolus which prevents the passage of the second end section of the tension member out of the second through-opening as aforesaid.

3. The assembly as defined in claim 1 further including a first bearing which is interposed between the first end section of the tension member and the body of the first head to facilitate the permitted rotation of the body of the first head and the first end section of the tension member relative to one another and further including a second bearing which is interposed between the second end section of the tension member and the body of the second head to facilitate the permitted rotation of the body of the second head and the second end section of the tension member relative to one another.

4. The assembly as defined in claim 3 wherein the first head includes a first circular recess which is associated with the through-opening defined in the body of the first head and which opens out of an end of the body of the first head and the first bearing is positioned within the first circular recess, and the second head includes a second circular recess which is associated with the through-opening defined in the body of the second head and the second bearing is positioned within the second circular recess.

5. The assembly as defined in claim 1 wherein one of the first and second heads includes a bifurcated portion having a pair of forks and a pin which extends between the forks of the pair of forks, and the first or second cable which is connectable to the body of a corresponding one of the first and second heads is capable of being connected to said one head by looping the first or second cable about the pin.

6. The assembly as defined in claim 5 further including a spool-shaped item having a central opening through which the pin extends and a smooth outer surface for engaging the cable to which the first head is connectable.

7. The assembly as defined in claim 1 wherein the body of each of the first and second heads includes one end portion having a conically-shaped outer surface.

8. The assembly as defined in claim 7 wherein the body of each of the first and second heads includes an end portion opposite said conically-shaped one end portion includes a pair of forks between which a corresponding first cable or second cable is connectable.

9. The assembly as defined in claim 8 further including a pin which extends between the pair of forks of the body of each of the first and second heads, and the first or second cable which is connectable to the body of a corresponding one of the first and second heads is capable of being connected to the corresponding one of the first and second heads by looping the first or second cable about the pin.

10. A swivel coupling assembly connectable between two cables for purposes of pulling one of the two cables by way of the other of the two cables, said assembly comprising:

a first head having an elongated body to which one of the two cables is connectable, the body of the first head defining a first through-opening which extends longitudinally through the body of the first head and includes a trailing end portion disposed adjacent one end of the elongated body of the first head, and the trailing end portion includes a substantially conically-shaped outer surface;

a second head having an elongated body to which the other of the two cables is connectable, the body of the second head defining a second through-opening which extends longitudinally through the body of the second head and includes a leading end portion disposed adjacent one end of the elongated body of the second head, and the leading end portion includes a substantially conically-shaped surface;

a flexible tension member having two opposite first and second end sections wherein the first end section of the tension member extends through the first through-opening of the body of the first head and is prevented from passing out of the first through-opening toward the body of the second head and the second end section of the tension member extends through the second through-opening of the body of the second head and is prevented from passing out of the second through-opening toward the body of the first head and wherein the body of the first head and the first end section of the tension member are capable of being rotated relative to one another and the body of the second head and the second end section of the tension member are capable of being rotated relative to one another; and wherein the flexible tension member possesses a length sufficient to permit the first and second heads to be moved with respect to one another between a first position at which the longitudinal axes of the bodies of the first and second heads are substantially aligned and a second position at which the longitudinal axes of the bodies of the first and second heads are oriented at substantially a right angle; and wherein the first end section of the tension member terminates at a first bolus which prevents the passage of the first end section of the tension member out of the first through-opening as aforesaid and the second end section of the tension member terminates at a second bolus which prevents the passage of the second end section of the tension member out of the second through-opening as aforesaid.

11. The assembly as defined in claim 10 further including a first bearing which is interposed between the first end section of the tension member and the body of the first head to accommodate the permitted rotation of the body of the first head and the first end section of the tension member relative to one another and further including a second bearing which is interposed between the second end section of the tension member and the body of the second head to accommodate the permitted rotation of the body of the second head and the second end section of the tension member relative to one another.

12. The assembly as defined in claim 10 wherein the first head includes a first circular recess which is associated with the through-opening defined in the body of the first head and which opens out of an end of the body of the first head and the first bearing is positioned within the first circular recess, and the second head includes a second circular recess which is associated with the through-opening defined in the body of the second head and the second bearing is positioned within the second circular recess.

13. The assembly as defined in claim 10 wherein one of the first and second heads includes a bifurcated portion having a pair of forks and a pin which extends between the forks of the pair of forks, and the one of the first cable or the second cable which is connectable to the body of the corresponding one of the first and second heads is capable of being secured to said one head by looping the first or second cable about the pin.

14. The assembly as defined in claim 13 further including a spool-shaped item having a central opening through which the pin extends and a smooth outer surface about which the corresponding first cable or second cable can be looped when connected to said corresponding one of the first and second heads.

15. The assembly as defined in claim 10 wherein the body of each of the first and second heads includes an end portion having a conically-shaped outer surface.

16. The assembly as defined in claim 15 wherein the body of each of the first and second heads includes an end portion opposite the said conically-shaped one end portion includes a pair of forks between which a corresponding first cable or second cable is connectable.

17. The assembly as defined in claim 16 further including a pin which extends between the pair of forks of the body of each head, and the first or second cable which is connectable to the body of a corresponding one of the first and second heads is capable of being connected to the corresponding one of the first and second heads by looping the first or second cable about the pin.

18. A swivel coupling assembly for cable-pulling purposes, said assembly comprising:
a first head having a body to which a first cable is connectable, the body of the first head defining a first through-opening which extends longitudinally through the body of the first head,
a second head having an elongated body to which a second cable is connectable, the body of the second head defining a second through-opening which extends longitudinally through the body of the second head, and
a flexible tension member having two opposite first and second end sections wherein the first end section of the tension member extends through the first through-opening of body of the first head and is prevented from passing out of the first through-opening toward the body of the second head and the second end section of the tension member extends through the second through-opening of the body of the second head and is prevented from passing out of the second through-opening toward the body of the first head and wherein the body of the first head and the first end section of the tension member are capable of being rotated relative to one another and the body of the second head and the second end section of the tension member are capable of being rotated relative to one another; and
wherein the flexible tension member possesses a length sufficient to permit the first and second heads to be moved with respect to one another from a first position at which the longitudinal axes of the bodies of the first and second heads are substantially aligned to a second position at which the longitudinal axes of the bodies of the first and second heads are oriented at substantially a right angle; and
a first bearing which is interposed between the first end section of the tension member and the body of the first head to facilitate the permitted rotation of the body of the first head and the first end section of the tension member relative to one another and further including a second bearing which is interposed between the second end section of the tension member and the body of the second head to facilitate the permitted rotation of the body of the second head and the second end section of the tension member relative to one another; and
wherein the first head includes a first circular recess which is associated with the through-opening defined in the body of the first head and which opens out of an end of the body of the first head and the first bearing is positioned within the first circular recess, and the second head includes a second circular recess which is associated with the through-opening defined in the body of the second head and the second bearing is positioned within the second circular recess.

19. A swivel coupling assembly for cable-pulling purposes, said assembly comprising:
a first head having a body to which a first cable is connectable, the body of the first head defining a first through-opening which extends longitudinally through the body of the first head,
a second head having an elongated body to which a second cable is connectable, the body of the second head defining a second through-opening which extends longitudinally through the body of the second head, and
a flexible tension member having two opposite first and second end sections wherein the first end section of the tension member extends through the first through-opening of body of the first head and is prevented from passing out of the first through-opening toward the body of the second head and the second end section of the tension member extends through the second through-opening of the body of the second head and is prevented from passing out of the second through-opening toward the body of the first head and wherein the body of the first head and the first end section of the tension member are capable of being rotated relative to one another and the body of the second head and the second end section of the tension member are capable of being rotated relative to one another; and
wherein the flexible tension member possesses a length sufficient to permit the first and second heads to be moved with respect to one another from a first position at which the longitudinal axes of the bodies of the first and second heads are substantially aligned to a second position at which the longitudinal axes of the bodies of the first and second heads are oriented at substantially a right angle; and wherein one of the first and second heads includes a bifurcated portion having a pair of forks and a pin which extends between the forks of the pair of forks, and the first or second cable which is connectable to the body of a corresponding one of the first and second heads is capable of being connected to said one head by looping the first or second cable about the pin.

20. A swivel coupling assembly for cable-pulling purposes, said assembly comprising:
    a first head having a body to which a first cable is connectable, the body of the first head defining a first through-opening which extends longitudinally through the body of the first head,
    a second head having an elongated body to which a second cable is connectable, the body of the second head defining a second through-opening which extends longitudinally through the body of the second head, and
    a flexible tension member having two opposite first and second end sections wherein the first end section of the tension member extends through the first through-opening of body of the first head and is prevented from passing out of the first through-opening toward the body of the second head and the second end section of the tension member extends through the second through-opening of the body of the second head and is prevented from passing out of the second through-opening toward the body of the first head and wherein the body of the first head and the first end section of the tension member are capable of being rotated relative to one another and the body of the second head and the second end section of the tension member are capable of being rotated relative to one another; and wherein the flexible tension member possesses a length sufficient to permit the first and second heads to be moved with respect to one another from a first position at which the longitudinal axes of the bodies of the first and second heads are substantially aligned to a second position at which the longitudinal axes of the bodies of the first and second heads are oriented at substantially a right angle; and wherein the body of each of the first and second heads includes an end portion having a conically-shaped outer surface; and wherein the end of the body of each of the first and second heads opposite the said one end includes a pair of forks between which a corresponding first cable or a second cable is connectable.

* * * * *